(12) United States Patent
Akiba et al.

(10) Patent No.: US 8,715,829 B2
(45) Date of Patent: May 6, 2014

(54) GLASS PLATE FOR DISPLAY DEVICES

(75) Inventors: Shusaku Akiba, Chiyoda-ku (JP);
Kazutaka Hayashi, Chiyoda-ku (JP);
Kei Maeda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 311 days.

(21) Appl. No.: 12/474,667

(22) Filed: May 29, 2009

(65) Prior Publication Data

US 2009/0298669 A1 Dec. 3, 2009

(30) Foreign Application Priority Data

May 30, 2008 (JP) ................................. 2008-142579
Apr. 28, 2009 (JP) ................................. 2009-109236

(51) Int. Cl.
*B32B 17/00* (2006.01)
*B32B 17/06* (2006.01)
*C03C 3/085* (2006.01)
*C03C 3/087* (2006.01)

(52) U.S. Cl.
USPC ................ 428/410; 428/426; 501/69; 501/70

(58) Field of Classification Search
USPC ................................ 501/69, 70; 428/410, 426
See application file for complete search history.

(56) References Cited

U.S. PATENT DOCUMENTS

| | | | |
|---|---|---|---|
| 3,772,135 A | 11/1973 | Hara et al. | |
| 5,296,294 A * | 3/1994 | Suzuki et al. | 428/410 |
| 5,773,148 A * | 6/1998 | Charrue et al. | 428/410 |
| 5,804,317 A * | 9/1998 | Charrue | 428/410 |
| 5,900,296 A * | 5/1999 | Hayashi et al. | 428/64.1 |
| 6,333,285 B1 * | 12/2001 | Chopinet et al. | 501/69 |
| 6,518,211 B1 * | 2/2003 | Bradshaw et al. | 501/69 |
| 6,810,688 B1 * | 11/2004 | Duisit et al. | 65/30.13 |
| 6,949,485 B2 | 9/2005 | Nakashima et al. | |
| 7,309,671 B2 * | 12/2007 | Kurachi et al. | 501/70 |
| 2003/0110803 A1 * | 6/2003 | Saito et al. | 65/30.14 |
| 2005/0244656 A1 * | 11/2005 | Ikenishi et al. | 428/426 |
| 2006/0216552 A1 * | 9/2006 | Ikenishi et al. | 428/846.9 |
| 2008/0286548 A1 | 11/2008 | Ellison et al. | |
| 2009/0073130 A1 | 3/2009 | Weber et al. | |
| 2009/0090694 A1 | 4/2009 | Hotelling et al. | |
| 2009/0197088 A1 * | 8/2009 | Murata | 428/410 |
| 2009/0202808 A1 * | 8/2009 | Glaesemann et al. | 428/220 |
| 2009/0220761 A1 * | 9/2009 | Dejneka et al. | 428/220 |
| 2010/0210442 A1 * | 8/2010 | Abramov et al. | 501/66 |

FOREIGN PATENT DOCUMENTS

JP 2004-131314 4/2004
WO WO 2009/019965 A1 2/2009

OTHER PUBLICATIONS

Masayuki Yamane, et al., Glass Engineering Handbook, first edition, Asakura Publishing Co., Ltd., Jul. 5, 1999, p. 397.
U.S. Appl. No. 12/888,019, filed Sep. 22, 2010, Akiba, et al.
U.S. Appl. No. 13/115,626, filed May 25, 2011, Nakashima, et al.
U.S. Appl. No. 13/619,290, filed Sep. 14, 2012, Akiba, et al.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

To provide a glass plate for display devices wherein without carrying out a post treatment, the depth of a compression stress layer is increased, while the surface compression stress is prevented from being excess only by chemical tempering. A glass plate for display devices, which is obtained by chemically tempering a glass plate comprising, as represented by mol % based on the following oxides, from 50 to 74% of $SiO_2$, from 1 to 10% of $Al_2O_3$, from 6 to 14% of $Na_2O$, from 3 to 15% of $K_2O$, from 2 to 15% of MgO, from 0 to 10% of CaO and from 0 to 5% of $ZrO_2$, wherein the total content of $SiO_2$ and $Al_2O_3$ is at most 75%, the total content of $Na_2O$ and $K_2O$, i.e. $Na_2O+K_2O$, is from 12 to 25%, and the total content of MgO and CaO, i.e. MgO+CaO, is from 7 to 15%.

22 Claims, 1 Drawing Sheet

GLASS PLATE FOR DISPLAY DEVICES

BACKGROUND OF THE INVENTION

1. Field of the Invention

The present invention relates to a glass plate which is used as a cover glass for display devices, typically cell phones, PDA and small display devices such as touch panels.

2. Discussion of Background

In recent years, for mobile devices such as cell phones and PDA, use of a cover glass (protective glass) for protecting a display and improving appearance, is increasing.

On the other hand, weight reduction and thickness reduction are required for such PDA. Therefore, a cover glass used for protecting a display is also required to be thin. However, if the thickness of the cover glass is made to be thin, the strength is lowered, and if a display device is dropped at a time of using or carrying it, the cover glass itself may sometimes be broken. Therefore, there is a problem that the cover glass cannot accomplish the original object to protect display devices.

In order to solve the above problem, it is conceivable to improve the strength of the cover glass, and as such a method, a method to form a compressive stress layer on a glass surface is commonly known.

As the method to form a compressive stress layer on a glass surface, typical are an air quenching tempering method (physical tempering method) wherein a surface of a glass plate heated to near the softening point is quenched by air cooling or the like and a chemical tempering method wherein alkali metal ions having a small ion radius (typically Li ions or Na ions) on a glass plate surface are exchanged with alkali ions having a larger ion radius (typically K ions) by ion exchange at a temperature lower than the glass transition point.

As mentioned above, the thickness of the cover glass is required to be thin. If the air cooling tempering method is applied to a thin glass plate, the temperature difference between the surface and the inside tends not to arise, and it is thereby difficult to form a compressive stress layer, and the desired property of high strength cannot be obtained. Therefore, a cover glass tempered by the latter chemical tempering method is usually used (Patent Document 1).

Although the chemical tempering method is a method suitable for tempering a thin glass plate, if it is attempted to apply the chemical tempering method to a thinner glass plate, there is a problem of increasing the internal tensile stress generated to take a balance with a high compressive stress on a surface. That is, if the internal tensile stress is high, when a crack deeper than the surface compressive stress layer is formed, the glass will break spontaneously due to a large tensile strength pulling the tip of the crack. In order to reduce the internal tensile stress to suppress this spontaneous breakage of glass, the depth of the surface compressive stress layer may be reduced. However, in such a case, glass becomes extremely weak against breakage or crack, and the desired strength cannot be obtained.

While such problems are considered in the case of the chemical tempering method, as a cover glass for mobile devices, for example a glass plate (hereinafter referred to as commercially available glass plate) having a thickness of 0.75 mm obtained by chemical tempering of a glass (hereinafter referred to as glass A) having a composition of, as represented by mol %, $SiO_2$: 68.4%, $Al_2O_3$: 10.6%, $Na_2O$: 11.9%, $K_2O$: 2.3%, MgO: 5.6%, CaO: 0.3%, $TiO_2$: 0.6% and $As_2O_3$: 0.3% has been used. The surface compressive stress S and the surface compressive stress layer thickness t of the commercially available glass plate were measured, and as a result, S was 684 MPa, and t was 48 μm.

Here, when a cover glass is produced, glass is usually polished. The size of abrasive grains used at a first stage of the polishing is typically 100 μm, and it is considered that by the polishing with such abrasive grains, microcracks in a depth of 40 μm are formed (Non-Patent Document 1, FIG. 1.18).

As mentioned above, t of the commercially available glass plate, namely 48 μm, is larger than the typical value of the microcrack depth formed on the glass plate, namely. 40 μm, whereby the commercially available glass tends not to be broken (FIG. 1.18 of Non-Patent Document 1).

Patent Document 1: US Application Serial Number 2008/0286548

Non-Patent Document 1: Glass Engineering Handbook, edited by Masayuki Yamane et. al, first edition, Asakura Publishing Co., Ltd., Jul. 5, 1999, p. 397

SUMMARY OF THE INVENTION

The present inventors produced a plate-form glass A having a thickness of 2.6 mm, carried out chemical tempering by immersing it in a $KNO_3$ molten salt under various conditions of temperature (unit: °C.) and time (unit: time) and measured S (unit: MPa) and t (unit: μm) of the obtained glass plates. The results are shown in Table 1.

It is evident from Table 1 that when glass A was simply chemically tempered to make t be at a level of about 48 μm, S was from 1,111 to 1,128 MPa.

Thus, the commercially available glass plate cannot be obtained by simply chemically tempering glass A, and it is considered that the commercially available glass plate is produced by carrying out a specific treatment (post treatment) to lower S or t after the chemical tempering. Further, the reason why such a post treatment is required is considered to be such that the rate of ion exchange of glass A is too high.

It is an object of the present invention to provide a glass, of which t can be made to exceed, for example, 40 μm, and S can be made to be, for example, less than 1,050 MPa by only chemical tempering without carrying out a post treatment, a glass plate for display devices obtained by chemically tempering such a glass, and a display device, of which a display is protected by such a glass plate for display devices.

TABLE 1

| Temperature | Time | S | t |
| --- | --- | --- | --- |
| 400 | 4 | 1167 | 28 |
| 400 | 6 | 1161 | 34 |
| 400 | 8 | 1146 | 39 |
| 425 | 4 | 1129 | 39 |
| 425 | 6 | 1128 | 46 |
| 425 | 8 | 1111 | 53 |
| 450 | 4 | 1008 | 62 |
| 450 | 6 | 985 | 72 |
| 450 | 8 | 956 | 86 |
| 500 | 4 | 825 | 96 |
| 500 | 6 | 780 | 117 |
| 500 | 8 | 751 | 132 |

The present invention provides a glass to be chemically tempered (the glass of the present invention) for display devices, comprising, as represented by mol % based on the following oxides, from 50 to 74% of $SiO_2$, from 1 to 10% of $Al_2O_3$, from 6 to 14% of $Na_2O$, from 3 to 15% of $K_2O$, from 2 to 15% of MgO, from 0 to 10% of CaO and from 0 to 5% of $ZrO_2$, wherein the total content of $SiO_2$ and $Al_2O_3$ is at most 75%, the total content of $Na_2O$ and $K_2O$ is from 12 to 25%, and the total content of MgO and CaO, i.e. MgO+CaO, is from 7 to 15%.

Further, the present invention provides a glass to be chemically tempered (glass 1 of the present invention) for display devices which is the glass of the present invention, wherein $Na_2O$ is at most 12%, $K_2O$ is at least 4%, $Na_2O+K_2O$ is at least 14%, MgO+CaO is at least 8%, the difference obtained by deducting the content of $Al_2O_3$ from $Na_2O+K_2O$ is at least 10%, and in a case where the glass plate contains BaO, the content of BaO is less than 1%.

Further, the present invention provides a glass to be chemically tempered for display devices which is the glass 1, wherein in a case where the glass plate contains SrO or BaO, the total content of alkaline earth metal oxides is at most 15%.

Further, the present invention provides a glass to be chemically tempered for display devices which is the glass of the present invention, wherein $SiO_2$ is from 60 to 70%, $Al_2O_3$ is from 2 to 8%, $Na_2O$ is at most 11%, $K_2O$ is from 6 to 12%, MgO is from 4 to 14%, CaO is from 0 to 8%, $ZrO_2$ is from 0 to 4%, and $Na_2O+K_2O$ is from 16 to 20%.

Further, the present invention provides a glass (glass 2A of the present invention) to be chemically tempered for display devices which is the glass of the present invention, wherein $SiO_2$ is from 60 to 70%, $Al_2O_3$ is from 2 to 8%, $K_2O$ is at most 8%, MgO is at least 6%, $Na_2O+K_2O$ is at most 18%, and the sum of the content of $K_2O$ multiplied by 1.7 and the content of $Na_2O$, i.e. $Na_2O+1.7K_2O$, is less than 19%.

Further, the present invention provides a glass (glass 2B of the present invention) to be chemically tempered for display devices which is the glass of the present invention, wherein $SiO_2$ is at least 63%, $Al_2O_3$ is at least 3%, $Na_2O$ is at least 8%, $K_2O$ is at most 8%, MgO is from 6 to 14%, CaO is from 0 to 1%, $ZrO_2$ is from 1 to 4%, and $Na_2O+K_2O$ is from 14 to 17%.

Further, the present invention provides a glass to be chemically tempered for display devices which is the glass 2B of the present invention, wherein the sum of the content of $K_2O$ multiplied by 1.7 and the content of $Na_2O$, i.e. $Na_2O+1.7K_2O$, is less than 19%.

Further, the present invention provides a glass plate (glass plate of the present invention) for display devices, which is obtained by chemically tempering a glass plate comprising, as represented by mol % based on the following oxides, from 50 to 74% of $SiO_2$, from 1 to 10% of $Al_2O_3$, from 6 to 14% of $Na_2O$, from 3 to 15% of $K_2O$, from 2 to 15% of MgO, from 0 to 10% of CaO and from 0 to 5% of $ZrO_2$, wherein the total content of $SiO_2$ and $Al_2O_3$ is at most 75%, the total content of $Na_2O$ and $K_2O$ is from 12 to 25%, and the total content of MgO and CaO, i.e. MgO+CaO, is from 7 to 15%, namely a glass plate for display devices, which is obtained by chemically tempering the glass plate made of the glass of the present invention.

Further, the present invention provides a glass plate for display devices, wherein the glass plate to be chemically tempered of the present invention is produced by a float process.

Further, the present invention provides a display device provided with a chemically tempered glass plate for protecting a display and the display, wherein the chemically tempered glass plate is the glass plate of the present invention.

The present inventors have found that in order to increase the above-mentioned t without excessively increasing a rate of ion exchange, it is effective to increase the content of $K_2O$, and thus the present invention has been accomplished.

Effects of the Invention

According to the present invention, without carrying out a post treatment which is separately carried out from the chemical tempering treatment, it is possible to increase t, while S of the glass plate for display devices is maintained to be less than 1,050 MPa. Further, the glass plate of the present invention can be produced by a float process.

Further, according to a preferred embodiment of the present invention, without a post treatment which is separately carried out from the chemical tempering treatment, it is possible to increase t, while S of the glass plate for display devices is maintained to be less than 750 MPa.

Further, according to another preferred embodiment of the present invention, it is possible to obtain a glass to be chemically tempered for display devices which is preferably clarified with a sulfate. That is, it is possible to obtain a glass to be chemically tempered for display devices of excellent quality for bubbles, stably with a low environmental load.

DETAILED DESCRIPTION OF THE PREFERRED EMBODIMENTS

Figure 1:
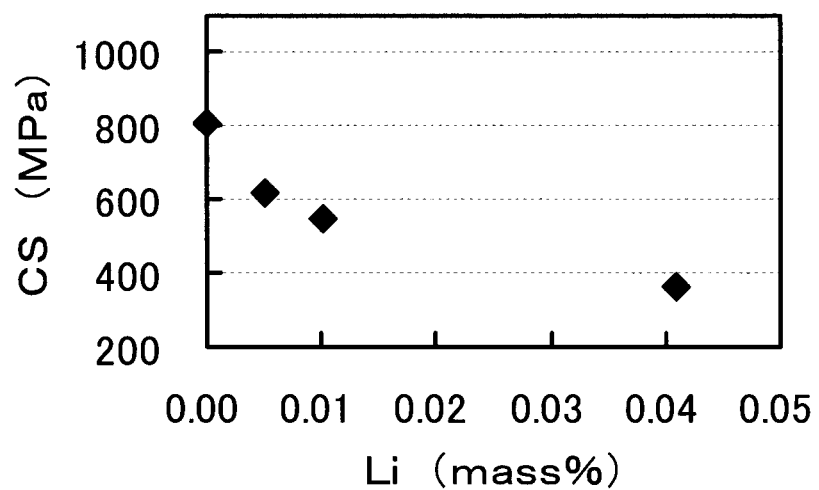
FIG. 1 shows a relationship of a Li content in a molten salt ($KNO_3$) and a surface compressive stress CS of a glass which is chemically tempered with the molten salt.

The thickness of the glass plate of the present invention is typically from 0.2 to 1.0 mm. If the thickness is less than 0.2 mm, even though the chemical tempering is carried out, a problem may arise from the viewpoint of the strength for practical use.

The glass plate of the present invention preferably has t of more than 20 μm. If t is at most 20 μm, the glass may be fragile. t is more preferably at least 30 μm, particularly preferably at least 40 μm, typically at least 45 μm or at least 50 μm.

S of the glass plate of the present invention is typically at least 300 MPa and less than 1,050 MPa. If S is less than 300 MPa, the glass may be fragile. Further, S of the glass plate of the present invention made of the glass 2A of the present invention is typically at least 300 MPa and less than 750 MPa, and S of the glass plate of the present invention made of the glass 2B of the present invention is typically at least 700 MPa and less than 1,050 MPa.

As mentioned above, the glass plate of the present invention is obtained by chemically tempering the plate form glass of the present invention.

The method for producing the plate form glass of the present invention is not particularly restricted, however, it may, for example, be produced by mixing various materials in appropriate amounts, heating the mixture to about 1,400 to 1,600° C. to melt it, then defoaming and homogenizing it by stirring, forming it into a plate shape by a well-known float process, down draw process or press method and slowly cooling it, followed by cutting in a desired size and polishing.

The chemical tempering method is not particularly restricted as long as $Na_2O$ in the surface layer of the glass plate can be ion exchanged with $K_2O$ in a molten salt, however, a method may, for example, be mentioned wherein the glass plate is immersed in a heated potassium nitrate ($KNO_3$) molten salt.

The condition for forming a chemically tempered layer (surface compressive stress layer) having a desired surface compressive stress on the glass plate varies depending on the thickness of the glass plate, however, typically the glass plate is immersed in a $KNO_3$ molten salt at from 400 to 550° C. for from 2 to 20 hours. From the viewpoint of cost, the glass is preferably immersed under a condition of at from 400 to 500° C. for from 2 to 16 hours, more preferably immersed for from 2 to 10 hours.

The glass transition point Tg of the present invention is, in the case of the glass 1, typically from 540 to 610° C., and in the case of the glass 2A and 2B, typically from 580 to 640° C.

The temperature $T_4$ at which the viscosity of the glass of the present invention becomes $10^4$ dPa·s is preferably at most 1,190° C. If $T_4$ exceeds 1,190° C., it may be difficult to form glass. $T_4$ is typically at most 1,180° C.

The temperature $T_2$ at which the viscosity of the glass of the present invention becomes $10^2$ dPa·s is preferably at most 1,650° C. If $T_2$ exceeds 1,650° C., it is difficult to melt glass, production defects such as stones tend to form, or facility for meting glass may be expensive. $T_2$ is typically at most 1,600° C.

The devitrification temperature of the glass of the present invention is preferably at most the above $T_4$. Otherwise, if a glass is formed by a float process, devitrification occurs, and it is difficult to form glass. Here, the devitrification temperature means the maximum temperature at which devitrification precipitates when the glass is maintained at that temperature for 15 hours.

The specific gravity of the glass of the present invention is preferably at most 2.6. If the specific gravity exceeds 2.6, weight reduction of a display device may be insufficient.

The average linear expansion coefficient of the glass of the present invention at from 50 to 350° C. is typically from $80 \times 10^{-7}$ to $130 \times 10^{-7}$/° C.

Among the glasses of the present invention, the glass 1 is a preferred embodiment for increasing t without carrying out a post treatment which is separately carried out from the chemical tempering treatment, while S of the glass plate for display devices is maintained to be less than 750 MPa. Glasses 2A and 2B (hereinafter these glasses are referred to as glass 2) are preferred embodiments for carrying out a refining with a sulfate at the time of producing the glass.

Now, the composition of the glass of the present invention will be explained by using contents represented by mol % unless otherwise specified.

$SiO_2$ is an essential component to constitute a glass matrix. If $SiO_2$ is less than 50%, stability of glass deteriorates, and weather resistance deteriorates. $SiO_2$ is preferably at least 60%. Further, in the glass 2A, $SiO_2$ is at least 60%, preferably at least 62%, and in the glass 2B, $SiO_2$ is at least 63%.

If $SiO_2$ exceeds 74%, the viscosity of glass increases, and a melting property is remarkably lowered. $SiO_2$ is preferably at most 70%, typically at most 68%. Further, in the glass 2A, $SiO_2$ is at most 70%.

$Al_2O_3$ is an essential component for improving a rate of ion exchange. If $Al_2O_3$ is less than 1%, the rate ion exchange becomes low. $Al_2O_3$ is preferably at least 2%, typically at least 3%. Further, in the glass 2A, $Al_2O_3$ is at least 2%, and in the glass 2B, $Al_2O_3$ is at least 3%.

If $Al_2O_3$ exceeds 10%, the viscosity of the glass becomes high, and it is difficult to melt glass homogenously. $Al_2O_3$ is preferably at most 9%, more preferably at most 8%, typically at most 7%. Further, in the glass 2A, $Al_2O_3$ is at most 8%.

If the total content of $SiO_2$ and $Al_2O_3$ exceeds 75%, the glass viscosity at a high temperature increases, and it is difficult to melt glass. The total content is typically at most 72%. Further, the total content of $SiO_2$ and $Al_2O_3$ is preferably at least 66%. If the total content of $SiO_2$ and $Al_2O_3$ is less than 66%, stable glass tends not to be obtained, and weather resistance tends to deteriorate. The total content is typically at least 68%.

$Na_2O$ is an essential component for forming a surface compressive stress layer by ion exchange and improving a melting property of glass. If $Na_2O$ is less than 6%, it is difficult to form a desired surface compressive stress layer by ion exchange. $Na_2O$ is preferably at least 7%, typically at least 8%. Further, in the glass 2B, $Na_2O$ is at least 8%.

If $Na_2O$ exceeds 14%, Tg becomes low, and accordingly the strain point becomes low, or weather resistance deteriorates. $Na_2O$ is preferably at most 13%, typically at most 12%. Further, in the glass 1, $Na_2O$ is most 12%, preferably at most 11%, typically at most 10%.

$K_2O$ is an essential component for improving a melting property as well as for increasing a rate of ion exchange in the chemical tempering to obtain a desired S and t. If $K_2O$ is less than 3%, the melting property deteriorates, or the rate of ion exchange becomes low. $K_2O$ is typically at least 4%. Further, in the glass 1, $K_2O$ is at least 4%, preferably at least 5%, more preferably at least 6%, typically at least 7%. Further, the content of $K_2O$ as represented by mass % is typically at least 3%.

If $K_2O$ exceeds 15%, weather resistance deteriorates. $K_2O$ is preferably at most 12%, typically at most 11%. Further, in the glass 2, $K_2O$ is at most 8%, preferably at most 7%, typically at most 6%.

If the content of $R_2O$ which is the total content of $Na_2O$ and $K_2O$ is less than 12%, the desired ion exchange property cannot be obtained. $R_2O$ is preferably at least 13%, more preferably at least 14%. Further, in the glass 1 and 2B, $R_2O$ is at least 14%, and in the glass 1, $R_2O$ is preferably at least 16%, more preferably at least 16.5%, typically at least 17%.

If $R_2O$ exceeds 25%, chemical durability of the glass such as weather resistance deteriorates. $R_2O$ is preferably at most 22%, more preferably at most 20%, typically at most 19%. Further, in order to lower a basicity of glass to improve a refining property with a sulfate, in the glass 2A, $R_2O$ is at most 18%, and in the glass 2B, $R_2O$ is at most 17%.

In order to lower a basicity of glass to improve a refining property with a sulfate, in the glass 2A, the above-mentioned $Na_2O+1.7K_2O$ is preferably less than 19%. In the glass 2B, $Na_2O+1.7K_2O$ is also preferably less than 19%. Further, "lower basicity of glass to improve a refining property with a sulfate" means that in a case of a refining with sodium sulfate, the decomposition temperature of sodium sulfate is made to be at most about 1,500° C.

The difference obtained by deducting the content of $Al_2O_3$ from the above mentioned $R_2O$, namely $R_2O-Al_2O_3$ is preferably at least 10%. If $R_2O-Al_2O_3$ is less than 10%, t The reason why t becomes small is considered to be increase of Tg and accordingly increase of the strain point. Further, in the glass 1, $R_2O-Al_2O_3$ is at least 10%.

The difference obtained by deducting $R_2O$ from the total content of $SiO_2$ and $Al_2O_3$ is preferably at most 60%. If it exceeds 60%, the above-mentioned $T_2$ exceeds 1,650° C., and it may be difficult to melt glass.

$Li_2O$ is a component to lower the strain point whereby stress tends to be relaxed, and as a result, a stable surface compressive stress layer cannot be obtained. Therefore, glass preferably contains no $Li_2O$. Even if $Li_2O$ is contained, the content of $Li_2O$ is preferably at most 2%, more preferably at most 0.05%, particularly preferably less than 0.01%.

Further, although at the time of chemical tempering treatment, $Li_2O$ sometimes elutes into a molten salt such as $KNO_3$, if the chemical tempering treatment is carried out with a molten salt containing Li, the surface compress stress is remarkably lowered. That is, the present inventors chemically tempered the glass of the after-mentioned Example 19 by using $KNO_3$ containing no Li, $KNO_3$ containing 0.005 mass % of Li, $KNO_3$ containing 0.01 mass % of Li and $KNO_3$ containing 0.04 mass % of Li under the condition of at 450° C. for 6 hours, and as a result, they found that as shown in FIG. 1, even though 0.005 mass % of Li was contained, the surface compressive stress was remarkably lowered. Therefore, from the above viewpoint, it is preferred to contain no $Li_2O$.

The ratio of the content of $K_2O$ to the total content of alkali metal oxides is preferably at least 0.25, more preferably at least 0.4, typically higher than 0.5.

The alkaline earth metal oxides are components to improve a melting property as well as a component which is effective to adjust Tg and accordingly the strain point.

Since among the alkaline earth metals, BaO has the highest effect to lower the rate of ion exchange, it is preferred to contain no BaO, and even if BaO is contained, the content of BaO is preferably less than 1%, and in the glass 1, even if contained, the content of BaO needs to be less than 1%.

As the case requires, SrO may be contained, however, since compared to MgO and CaO, SrO has a high effect to lower the rate of ion exchange, even if contained the content of SrO is preferably less than 1%.

In a case where SrO or BaO is contained, the total of their contents is preferably at most 3%, more preferably less than 2%.

The effect of MgO and CaO to lower the rate of ion exchange is relatively small, and at least 2% of MgO must be contained.

If MgO is less than 2%, a melting property deteriorates. MgO is preferably at least 4%, more preferably at least 6%, typically at least 6.5%. Further, in the glass 2, MgO is at least 6%, preferably at least 6.5%, typically at least 10%.

If MgO exceeds 15%, the rate of ion exchange becomes low. MgO is preferably at most 14%, more preferably at most 13.5%. Further, in the glass 1, MgO is particularly preferably at most 13%, typically at most 12%, and in the glass 2B, MgO is at most 14%.

In a case where CaO is contained, its content is typically at least 1%. If the content of CaO exceeds 10%, the rate of ion exchange becomes low. The content of CaO is preferably at most 8%, typically at most 6%. Further, in the glass 2A, even if CaO is contained, the content of CaO is typically at most 1%, and in the glass 2B, the content of CaO must be at most 1%.

In a case where CaO is contained, the ratio of the content of MgO to the content of CaO is preferably at least 1, more preferably at least 1.1.

The total content of MgO and CaO, namely MgO+CaO is from 7 to 15%, typically at least 8%, and in the glass 1, MgO+CaO must be at least 8%. Further, the total content of MgO and CaO as represented by mass % is typically at least 5.1%.

The ratio of the content of MgO+CaO to the content of $Al_2O_3$ is preferably at least 1.2, typically at least 1.5.

The total content of alkaline earth metal oxides, RO is preferably from higher than 2% to at most 15%. If RO is at most 2%, the melting property deteriorates, or it is difficult to control the strain point. RO is preferably at least 4%, more preferably at least 6%, typically at least 8%. If RO exceeds 15%, the rate of ion exchange becomes low, glass tends to devitrificate, or the strain point may be too low.

Except for the glass 2B, $ZrO_2$ is not essential for the glass of the present invention, however, in order to increase the rate of ion exchange, $ZrO_2$ may be contained up to 5%. If $ZrO_2$ exceeds 5%, the effect to increase the rate of ion exchange is excessive, and the melting property deteriorates, whereby stones may remain in glass in some cases.

Figure 2:
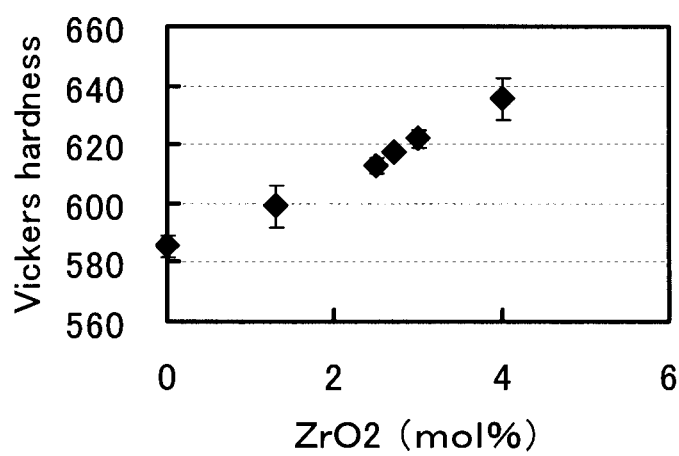
FIG. 2 shows a relationship of a $ZrO_2$ content in a glass and a Vickers hardness of the glass after the chemical tempering treatment (with respect to glasses of the after-mentioned Examples 5, 9 and 10, a glass having a composition as represented by mol % of $SiO_2$: 64.0%, $Al_2O_3$: 5.4%, $Na_2O$: 9.6%, $K_2O$: 9.1%, MgO: 5.4%, CaO: 4.0% and $ZrO_2$: 2.5%, a glass having the composition of $SiO_2$: 64.0%, $Al_2O_3$: 5.3%, $Na_2O$: 9.6%, $K_2O$: 9.1%, MgO: 5.2%, CaO: 4.0% and $ZrO_2$: 2.7% and a glass having the composition of $SiO_2$: 66.8%, $Al_2O_3$: 11.0%, $Na_2O$: 13.1%, $K_2O$: 2.5%, MgO: 6.1% and CaO: 0.6%).

Further, as shown in FIG. 2, when $ZrO_2$ is contained, the Vickers hardness of the glass after the chemical tempering treatment increases. $ZrO_2$ is preferably at most 4%, typically at most 2%. In a case where $ZrO_2$ is contained, the content of $ZrO_2$ is preferably at least 0.5%, typically at least 1%.

In the glass 2B, $ZrO_2$ is essential, and from 1 to 4% of $ZrO_2$ is contained. $ZrO_2$ is typically from 1.5 to 3%.

The glass 1 of the present invention typically comprises from 60 to 70% of $SiO_2$, from 2 to 8% of $Al_2O_3$, at most 11% of $Na_2O$, from 6 to 12% of $K_2O$, from 4 to 14% of MgO, from 0 to 8% of CaO, from 0 to 4% of $ZrO_2$ and from 16 to 20% of $Na_2O+K_2O$.

The glass of the present invention is basically made of the above-explained components, and so long as the object of the present invention is not impaired, other components may be contained. In a case where such other components are contained, the total of such components is preferably at most 10%, typically at most 5%. Now, the above-mentioned other components will be explained.

In some cases, ZnO may be contained up to 2% in order to improve the melting property at a high temperature, however, ZnO is preferably at most 1%. In a case where the glass is produced by a float process, ZnO is preferably at most 0.5%. If ZnO exceeds 0.5%, ZnO is reduced at the time of producing the glass by the float process, and production defects may result. ZnO is typically not contained.

$B_2O_3$ may be contained up to 1% in order to improve the melting property at a high temperature and the glass strength. If $B_2O_3$ exceeds 1%, it is difficult to obtain homogenous glass, and to form glass. $B_2O_3$ is typically not contained.

Since $TiO_2$ changes an oxidation reduction state of Fe ions ($Fe^{2+}$, $Fe^{3+}$) present in glass, whereby the visible light transmittance changes, and glass is stained, if contained, $TiO_2$ is preferably at most 1%, and $TiO_2$ is typically not contained.

As a refining agent at a time of melting glass, $SO_3$, chlorides or fluorides may be appropriately contained. However, in order to increase visibility of display devices such as a touch panel, it is preferred to reduce contamination of impurities such as $Fe_2O_3$, NiO or $Cr_2O_3$ having an absorption in a visible light range in materials as possible, and each of $Fe_2O_3$, NiO and $Cr_2O_3$ is preferably at most 0.15% as represented by mass %, more preferably at most 0.05%.

EXAMPLES

In Examples 1 to 35 and 38 to 47, usually used glass materials such as oxides, hydroxides, carbonates and nitrates were appropriately selected so as to be compositions as represented by mol % shown in columns of $SiO_2$ to $ZrO_2$, $Li_2O$ or $TiO_2$ in Tables 2 to 7, such materials were weighed so as to be 400 g as glass, and although not shown in the above-mentioned compositions, sodium sulfate corresponding to 0.4 mass % as calculated as $SO_3$ was added to the materials, and the materials were mixed. Then, the mixture was added in a platinum crucible, the platinum crucible was put in a resistant heat type electric furnace at 1,600° C., and the mixture was melted for three hours, refined and homogenized, followed by casting it in a mold and slowly cooling at a predetermined temperature to obtain a glass block. The glass block was cut into a size of 40 mm×40 mm×0.8 mm in thickness and polished, and finally both surfaces where mirror polished to obtain a plate form glass. Further, "$R_2O-Al$" in Tables means the difference obtained by deducting the content of $Al_2O_3$ from the above-mentioned $R_2O$, "Na+1.7K" means the sum of the content of $Na_2O$ and $K_2O$ multiplied by 1.7, and Tables 8 to 13 show compositions as represented by mass % corresponding to compositions as represented by mol % in Tables 2 to 7.

Examples 1 to 17 and 19 to 35 are Examples of the present invention, and Examples 38 to 46 are Comparative Examples. Examples 18, 36 and 37 are Examples, and Examples 48 to 57 are Comparative Examples, wherein such a melting was not carried out. Example 47 is a Comparative Example wherein a separately prepared soda lime silica glass was used.

Such glasses were chemically tempered as mentioned below. That is, the chemical tempering treatment was carried out by immersing such glasses with a $KNO_3$ molten salt at 450° C. for 6 hours. The surface compressive stress S (unit: MPa) and the thickness t (unit: μm) of the compressive stress layer of respective glasses were measured by a surface stress meter FSM-6000, manufactured by Orihara Seisakusho Corporation. Tables 2 to 7 show results in columns. From Tables, it is evident that in cases where the glass of the present invention was used, S was from 300 MPa to 1,024 MPa, and t was at least 45 μm. Therefore, the desired compressive stress layer was formed.

Further, S and t in Examples 18, 36, 37 and 48 to 57 were calculated from the composition.

Further, in Examples 5, 40 and 47, Tg (unit: ° C.), $T_2$ (unit: ° C.), $T_4$ (unit: ° C.) and specific gravity ρ and α (unit: $10^{-7}$/° C.) were measured. Further, in Examples 19 and 20, Tg, $T_2$, $T_4$ and α were measured, and in Examples 24 to 26, Tg and α were measured. Tables show results in respective columns. Further, in other Examples, these values obtained by calculation from compositions are shown in Tables.

Further, in Examples 1, 4 to 10, 15 to 17, 19 to 35, 40, and 43 to 47, the following devitrification test was carried out. That is, glass was tested whether devitrification was formed or not, when the glass was held at a temperature of the above $T_4$ for 15 hours. In columns "D" in Tables, ○ means that the devitrification was not formed by the above test, and × means that the devitrification was formed. Further, even though the devitrification was formed at $T_4$, one that the devitrification was not formed at $T_4$+40° C. is represented as Δ.

In Examples 19 to 35, a test about decomposition of a sulfate was carried out. That is, the amount of $SO_3$ remaining in the glass was measured at 1,350° C. and 1,500° C., and these difference Δ was calculated (unit: mass %). In order to reduce forms in glass, Δ is preferably at least 0.08 mass %. In Examples 36 and 48 to 57, Δ was estimated from the compositions. Here, one having an estimated Δ of from 0.4 to 0.9 mass % is represented as "0.08" in Tables.

TABLE 2

| | Examples | | | | | | | | | |
|---|---|---|---|---|---|---|---|---|---|---|
| | 1 | 2 | 3 | 4 | 5 | 6 | 7 | 8 | 9 | 10 |
| $SiO_2$ | 67.4 | 65.2 | 65.2 | 63.0 | 63.5 | 64.5 | 66.4 | 62.6 | 63.3 | 63.5 |
| $Al_2O_3$ | 3.7 | 6.0 | 6.0 | 5.0 | 5.0 | 5.0 | 3.0 | 5.7 | 4.9 | 4.7 |
| MgO | 12.2 | 9.5 | 7.5 | 10.6 | 8.0 | 2.7 | 7.2 | 9.6 | 6.1 | 4.9 |
| CaO | 1.1 | 0 | 2.0 | 2.0 | 4.0 | 8.0 | 4.0 | 4.0 | 4.0 | 4.0 |
| SrO | 0.6 | 0 | 0 | 0 | 0 | 0 | 0 | 0 | 0 | 0 |
| $Na_2O$ | 8.1 | 9.0 | 9.0 | 9.3 | 9.4 | 9.5 | 9.3 | 9.2 | 9.6 | 9.7 |
| $K_2O$ | 6.3 | 9.0 | 9.0 | 8.8 | 8.9 | 9.0 | 8.9 | 8.8 | 9.1 | 9.2 |
| $ZrO_2$ | 0.7 | 1.3 | 1.3 | 1.3 | 1.3 | 1.3 | 1.3 | 0 | 3.0 | 4.0 |
| RO | 13.9 | 9.5 | 9.5 | 12.6 | 12.0 | 10.7 | 11.2 | 13.6 | 10.1 | 8.9 |
| $R_2O$ | 14.4 | 18.0 | 18.0 | 18.1 | 18.3 | 18.5 | 18.1 | 18.0 | 18.7 | 18.9 |
| $R_2O - Al$ | 10.7 | 12.0 | 12.0 | 13.1 | 13.3 | 13.5 | 15.1 | 12.3 | 13.7 | 14.2 |
| Na + 1.7K | 38.4 | 40.1 | 40.1 | 43.4 | 43.1 | 42.2 | 42.0 | 44.2 | 41.9 | 41.0 |
| S | 630 | 581 | 566 | 586 | 551 | 480 | 466 | 535 | 629 | 629 |
| t | 50 | 83 | 70 | 64 | 57 | 49 | 57 | 61 | 56 | 56 |
| Tg | 579 | 582 | 567 | 579 | 572 | 554 | 549 | 581 | 587 | 604 |
| $T_2$ | 1549 | 1588 | 1565 | 1520 | 1518 | 1520 | 1520 | 1520 | 1520 | 1520 |
| $T_4$ | 1125 | 1163 | 1151 | 1108 | 1097 | 1093 | 1094 | 1098 | 1117 | 1122 |
| D | ○ | | | ○ | ○ | ○ | ○ | ○ | ○ | X |
| ρ | 2.59 | 2.48 | 2.50 | 2.52 | 2.53 | 2.54 | 2.51 | 2.49 | 2.56 | 2.58 |
| α | 90 | 100 | 101 | 104 | 105 | 107 | 104 | 106 | 105 | 104 |

TABLE 3

| | Examples | | | | | | | | | |
|---|---|---|---|---|---|---|---|---|---|---|
| | 11 | 12 | 13 | 14 | 15 | 16 | 17 | 18 | 19 | 20 |
| $SiO_2$ | 62.9 | 62.4 | 64.8 | 66.7 | 69.4 | 62.9 | 64.1 | 52.0 | 64.5 | 65.5 |
| $Al_2O_3$ | 5.0 | 5.0 | 5.0 | 3.6 | 1.0 | 5.0 | 5.0 | 9.0 | 6.0 | 5.0 |
| MgO | 8.8 | 9.7 | 6.6 | 12.1 | 6.5 | 10.6 | 9.5 | 14.0 | 11.0 | 12.0 |
| CaO | 4.0 | 4.0 | 4.0 | 1.1 | 4.0 | 4.0 | 4.0 | 0 | 0 | 0 |
| SrO | 0 | 0 | 0 | 0.6 | 0 | 0 | 0 | 0 | 0 | 0 |
| $Na_2O$ | 8.4 | 7.4 | 9.4 | 11.0 | 9.2 | 7.4 | 9.2 | 10.0 | 12.0 | 10.0 |
| $K_2O$ | 9.6 | 10.2 | 8.9 | 4.2 | 8.7 | 8.9 | 6.9 | 14.0 | 4.0 | 5.0 |
| $ZrO_2$ | 1.3 | 1.3 | 1.3 | 0.7 | 1.3 | 1.3 | 1.3 | 1.0 | 2.5 | 2.5 |
| RO | 12.8 | 13.7 | 10.6 | 13.7 | 10.5 | 14.6 | 13.5 | 14.0 | 11.0 | 12.0 |
| $R_2O$ | 17.9 | 17.6 | 18.3 | 15.3 | 17.9 | 16.3 | 16.1 | 24.0 | 16.0 | 15.0 |
| $R_2O - Al$ | 12.9 | 12.6 | 13.3 | 11.6 | 16.9 | 11.3 | 11.1 | 15.0 | 10.0 | 10.0 |
| Na + 1.7K | 24.7 | 24.7 | 24.5 | 18.1 | 24.0 | 22.5 | 20.9 | 33.8 | 18.8 | 18.5 |

TABLE 3-continued

|  | Examples | | | | | | | | | |
|---|---|---|---|---|---|---|---|---|---|---|
|  | 11 | 12 | 13 | 14 | 15 | 16 | 17 | 18 | 19 | 20 |
| S | 526 | 486 | 526 | 743 | 391 | 529 | 648 | 568 | 1023 | 890 |
| t | 60 | 57 | 60 | 48 | 56 | 47 | 48 | 88 | 46 | 48 |
| Tg | 592 | 582 | 580 | 555 | 546 | 605 | 592 | 597 | 620 | 632 |
| $T_2$ | 1520 | 1540 | 1560 | 1512 | 1520 | 1520 | 1520 | 1471 | 1575 | 1589 |
| $T_4$ | 1112 | 1114 | 1126 | 1088 | 1083 | 1113 | 1104 | 1089 | 1168 | 1177 |
| D |  |  |  | ○ | ○ | ○ |  | ○ | ○ | ○ |
| ρ | 2.53 | 2.51 | 2.50 | 2.50 | 2.49 | 2.53 | 2.52 | 2.56 | 2.53 | 2.52 |
| α | 105 | 104 | 104 | 93 | 102 | 99 | 97 | 129 | 91 | 87 |
| Δ |  |  |  |  |  |  |  |  | 0.08 | 0.10 |

TABLE 4

|  | Examples | | | | | | | | | |
|---|---|---|---|---|---|---|---|---|---|---|
|  | 21 | 22 | 23 | 24 | 25 | 26 | 27 | 28 | 29 | 30 |
| $SiO_2$ | 64.5 | 66.5 | 67.0 | 61.0 | 61.0 | 61.0 | 61.0 | 61.0 | 62.0 | 62.0 |
| $Al_2O_3$ | 5.0 | 4.0 | 4.0 | 8.0 | 8.0 | 8.0 | 8.0 | 8.0 | 7.0 | 8.0 |
| MgO | 13.0 | 12.5 | 12.0 | 6.5 | 8.5 | 10.5 | 8.5 | 10.5 | 10.5 | 10.5 |
| CaO | 0 | 0 | 0 | 4.0 | 2.0 | 0 | 2.0 | 0 | 1.0 | 0 |
| SrO | 0 | 0 | 0 | 0 | 0 | 0 | 0 | 0 | 0 | 0 |
| $Na_2O$ | 9.5 | 8.6 | 8.6 | 12.0 | 12.0 | 12.0 | 11.0 | 11.0 | 12.0 | 12.0 |
| $K_2O$ | 5.5 | 5.9 | 5.9 | 6.0 | 6.0 | 6.0 | 7.0 | 7.0 | 5.0 | 6.0 |
| $ZrO_2$ | 2.5 | 2.5 | 2.5 | 2.5 | 2.5 | 2.5 | 2.5 | 2.5 | 2.5 | 1.5 |
| RO | 13.0 | 12.5 | 12.0 | 10.5 | 10.5 | 10.5 | 10.5 | 10.5 | 11.5 | 10.5 |
| $R_2O$ | 15.0 | 14.5 | 14.5 | 18.0 | 18.0 | 18.0 | 18.0 | 18.0 | 17.0 | 18.0 |
| $R_2O - Al$ | 10.0 | 10.5 | 10.5 | 10.5 | 10.5 | 10.5 | 10.5 | 10.5 | 10.0 | 10.0 |
| Na + 1.7K | 18.9 | 18.6 | 18.6 | 22.2 | 22.2 | 22.2 | 22.9 | 22.9 | 20.5 | 22.2 |
| S | 860 | 782 | 790 | 937 | 977 | 1001 | 910 | 931 | 953 | 958 |
| t | 45 | 50 | 50 | 46 | 52 | 60 | 55 | 62 | 50 | 61 |
| Tg | 628 | 628 | 627 | 601 | 618 | 628 | 606 | 608 | 611 | 594 |
| $T_2$ | 1566 | 1581 | 1589 | 1555 | 1563 | 1571 | 1573 | 1581 | 1554 | 1584 |
| $T_4$ | 1165 | 1174 | 1179 | 1150 | 1160 | 1170 | 1172 | 1182 | 1152 | 1171 |
| D | X | Δ | Δ | ○ | ○ | X | ○ | X | ○ | ○ |
| ρ | 2.53 | 2.52 | 2.51 | 2.58 | 2.56 | 2.55 | 2.56 | 2.55 | 2.55 | 2.52 |
| α | 89 | 87 | 87 | 99 | 99 | 100 | 101 | 100 | 97 | 100 |
| Δ | 0.09 | 0.10 | 0.10 | 0.00 | 0.02 | 0.03 | 0.02 | 0.04 | 0.02 | 0.03 |

TABLE 5

|  | Examples | | | | | | | | | |
|---|---|---|---|---|---|---|---|---|---|---|
|  | 31 | 32 | 33 | 34 | 35 | 36 | 37 | 38 | 39 | 40 |
| $SiO_2$ | 63.0 | 62.0 | 63.5 | 62.0 | 64.0 | 70.0 | 65 | 68.0 | 70.0 | 65.2 |
| $Al_2O_3$ | 6.5 | 7.0 | 6.5 | 7.0 | 5.5 | 5.5 | 5 | 6.0 | 1.0 | 6.0 |
| MgO | 11.0 | 12.0 | 11.0 | 11.5 | 12.5 | 7.0 | 12 | 0 | 1.0 | 8.0 |
| CaO | 0.5 | 0 | 0 | 0 | 0 | 0 | 0 | 9.0 | 1.0 | 7.0 |
| SrO | 0 | 0 | 0 | 0 | 0 | 0 | 0 | 0 | 0 | 1.0 |
| $Na_2O$ | 11.0 | 11.0 | 12.0 | 12.0 | 10.5 | 12.5 | 10 | 10.5 | 11.0 | 5.0 |
| $K_2O$ | 5.5 | 6.0 | 4.5 | 5.0 | 5.0 | 3.5 | 5 | 6.0 | 13.0 | 6.5 |
| $ZrO_2$ | 2.5 | 2.0 | 2.5 | 2.5 | 2.5 | 1.5 | 2 | 0.5 | 3.0 | 1.3 |
| $Li_2O$ | 0 | 0 | 0 | 0 | 0 | 0 | 1 | 0 | 0 | 0 |
| RO | 11.5 | 12.0 | 11.0 | 11.5 | 12.5 | 7.0 | 12 | 9.0 | 2.0 | 16.0 |
| $R_2O$ | 16.5 | 17.0 | 16.5 | 17.0 | 15.5 | 16.0 | 15 | 16.5 | 24.0 | 11.5 |
| $R_2O - Al$ | 10.0 | 10.0 | 10.0 | 10.0 | 10.0 | 10.5 | 10 | 10.5 | 23.0 | 5.5 |
| Na + 1.7K | 20.4 | 21.2 | 19.7 | 20.5 | 19.0 | 18.5 | 18.5 | 20.7 | 33.1 | 16.1 |
| S | 918 | 905 | 987 | 977 | 895 | 1024 | 811 | 649 | 597 | 409 |
| t | 52 | 57 | 51 | 53 | 49 | 51 | 37 | 33 | 85 | 39 |
| Tg | 616 | 609 | 614 | 612 | 623 | 599 | 582 | 567 | 527 | 645 |
| $T_2$ | 1568 | 1567 | 1568 | 1558 | 1562 | 1642 | 1527 | 1572 | 1560 | 1599 |
| $T_4$ | 1165 | 1164 | 1160 | 1157 | 1160 | 1186 | 1113 | 1118 | 1116 | 1178 |
| D | ○ | X | X | X | X |  |  |  |  | ○ |
| ρ | 2.54 | 2.53 | 2.54 | 2.55 | 2.53 | 2.46 | 2.52 | 2.50 | 2.49 | 2.55 |
| α | 94 | 97 | 94 | 96 | 91 | 89 | 90 | 98 | 119 | 84 |
| Δ | 0.04 | 0.04 | 0.04 | 0.03 | 0.03 | 0.08 |  |  |  |  |

TABLE 6

| | Examples | | | | | | | | | |
|---|---|---|---|---|---|---|---|---|---|---|
| | 41 | 42 | 43 | 44 | 45 | 46 | 47 | 48 | 49 | 50 |
| $SiO_2$ | 66.5 | 66.1 | 64.7 | 63.6 | 62.2 | 63.5 | 71.6 | 70.0 | 70.0 | 63.5 |
| $Al_2O_3$ | 3.6 | 3.6 | 5.0 | 5.0 | 5.0 | 5.0 | 0.9 | 5.5 | 6.5 | 5.3 |
| MgO | 12.0 | 11.9 | 11.0 | 15.9 | 13.2 | 11.9 | 5.9 | 6.0 | 6.0 | 12.2 |
| CaO | 4.4 | 1.1 | 4.0 | 4.0 | 4.0 | 4.0 | 8.5 | 0 | 0 | 0.2 |
| SrO | 0.6 | 0.6 | 0 | 0 | 0 | 0 | 0 | 0 | 0 | 0 |
| $Na_2O$ | 8.0 | 13.8 | 9.1 | 5.4 | 5.4 | 7.4 | 12.9 | 13.5 | 12.5 | 15.6 |
| $K_2O$ | 4.2 | 2.3 | 4.9 | 4.9 | 8.9 | 6.9 | 0.3 | 3.5 | 3.5 | 3.2 |
| $ZrO_2$ | 0.6 | 0.6 | 1.3 | 1.3 | 1.3 | 1.3 | 0 | 1.5 | 1.5 | 0 |
| RO | 17.0 | 13.6 | 15.0 | 19.9 | 17.2 | 15.9 | 14.4 | 6.0 | 6.0 | 12.4 |
| $R_2O$ | 12.2 | 16.1 | 14.0 | 10.3 | 14.3 | 14.3 | 13.2 | 17.0 | 16.0 | 18.8 |
| $R_2O$ − Al | 8.6 | 12.5 | 9.0 | 5.3 | 9.3 | 9.3 | 12.4 | 11.5 | 9.5 | 13.5 |
| Na + 1.7K | 15.1 | 17.7 | 17.4 | 13.7 | 20.5 | 19.1 | 13.4 | 19.5 | 18.5 | 21.0 |
| S | 688 | 749 | 737 | 499 | 437 | 620 | 588 | 1035 | 1088 | 880 |
| t | 30 | 39 | 35 | 27 | 43 | 40 | 15 | 53 | 51 | 56 |
| Tg | 602 | 518 | 605 | 652 | 617 | 605 | 540 | 588 | 606 | 558 |
| $T_2$ | 1511 | 1476 | 1520 | 1520 | 1520 | 1520 | 1460 | 1638 | 1666 | 1514 |
| $T_4$ | 1093 | 1052 | 1106 | 1126 | 1125 | 1115 | 1099 | 1177 | 1206 | 1073 |
| D | | | X | X | X | X | ○ | | | |
| ρ | 2.52 | 2.51 | 2.52 | 2.53 | 2.54 | 2.53 | 2.49 | 2.46 | 2.45 | 2.48 |
| α | 85 | 95 | 89 | 78 | 93 | 91 | | 92 | 88 | 105 |
| Δ | | | | | | | | <0.07 | 0.08 | <0.07 |

TABLE 7

| | Examples | | | | | | |
|---|---|---|---|---|---|---|---|
| | 51 | 52 | 53 | 54 | 55 | 56 | 57 |
| $SiO_2$ | 64.2 | 62.6 | 64.1 | 64.8 | 69.0 | 75.3 | 67.0 |
| $Al_2O_3$ | 5.3 | 8.3 | 8.4 | 5.3 | 4.6 | 3.6 | 6.4 |
| MgO | 12.7 | 6.5 | 4.9 | 12.1 | 6.8 | 6.1 | 6.4 |
| CaO | 0.2 | 4.6 | 1.2 | 0.4 | 0 | 0 | 0 |
| SrO | 0 | 0 | 0 | 0 | 0 | 0 | 0 |
| $Na_2O$ | 15.0 | 12.6 | 13.8 | 11.0 | 16.0 | 11.8 | 9.4 |
| $K_2O$ | 2.5 | 2.8 | 2.4 | 6.3 | 3.5 | 3.2 | 6.2 |
| $ZrO_2$ | 0 | 2.6 | 2.7 | 0 | 0 | 0 | 0.5 |
| $B_2O_3$ | 0 | 0 | 0 | 0 | 0.14 | 0 | 0 |
| ZnO | 0 | 0 | 0 | 0 | 0 | 0 | 3.19 |
| $TiO_2$ | 0 | 0 | 2.5 | 0 | 0 | 0 | 0.81 |
| RO | 12.9 | 11.1 | 8.6 | 12.5 | 6.8 | 6.1 | 6.4 |
| $R_2O$ | 17.6 | 15.3 | 16.3 | 17.4 | 19.5 | 15.1 | 15.6 |
| $R_2O$ − Al | 12.3 | 7.1 | 7.9 | 12.0 | 14.9 | 11.5 | 9.3 |
| Na + 1.7K | 19.3 | 17.3 | 18.0 | 21.8 | 21.9 | 17.3 | 20.0 |
| S | 909 | 1059 | 1312 | 729 | 925 | 917 | 888 |
| t | 51 | 28 | 36 | 62 | 61 | 52 | 58 |
| Tg | 567 | 640 | 625 | 593 | 538 | 573 | 589 |
| $T_2$ | 1524 | 1572 | 1603 | 1573 | 1536 | 1679 | 1612 |
| $T_4$ | 1083 | 1152 | 555 | 1133 | 1079 | 1192 | 1157 |
| D | | | | | | | |
| ρ | 2.48 | 2.57 | 2.48 | 2.46 | 2.43 | 2.39 | 2.51 |
| α | 100 | 91 | 89 | 100 | 103 | 85 | 90 |
| Δ | <0.07 | 0.08 | 0.08 | <0.07 | <0.07 | 0.08 | <0.07 |

TABLE 8

| | Examples | | | | | | | | | |
|---|---|---|---|---|---|---|---|---|---|---|
| | 1 | 2 | 3 | 4 | 5 | 6 | 7 | 8 | 9 | 10 |
| $SiO_2$ | 65.2 | 60.5 | 60.2 | 59.1 | 59.2 | 59.2 | 62.6 | 59.2 | 57.6 | 57.1 |
| $Al_2O_3$ | 6.0 | 9.4 | 9.4 | 8.0 | 7.9 | 7.8 | 4.8 | 9.2 | 7.6 | 7.1 |
| MgO | 7.9 | 5.9 | 4.6 | 6.7 | 5.0 | 1.7 | 4.6 | 6.1 | 3.7 | 3.0 |
| CaO | 1.0 | 0 | 1.7 | 1.8 | 3.5 | 6.9 | 3.5 | 3.5 | 3.4 | 3.4 |
| SrO | 1.0 | 0 | 0 | 0 | 0 | 0 | 0 | 0 | 0 | 0 |
| $Na_2O$ | 8.1 | 8.6 | 8.6 | 9.0 | 9.0 | 9.0 | 9.0 | 9.0 | 9.0 | 9.0 |
| $K_2O$ | 9.5 | 13.1 | 13.0 | 13.0 | 13.0 | 13.0 | 13.0 | 13.0 | 13.0 | 13.0 |
| $ZrO_2$ | 1.3 | 2.5 | 2.5 | 2.5 | 2.5 | 2.4 | 2.5 | 0 | 5.6 | 7.4 |

TABLE 9

| | Examples | | | | | | | | | |
|---|---|---|---|---|---|---|---|---|---|---|
| | 11 | 12 | 13 | 14 | 15 | 16 | 17 | 18 | 19 | 20 |
| $SiO_2$ | 58.6 | 58.1 | 60.1 | 65.2 | 66.1 | 59.1 | 60.7 | 46.9 | 60.9 | 62.2 |
| $Al_2O_3$ | 7.9 | 7.9 | 7.9 | 6.0 | 1.6 | 8.0 | 8.0 | 13.8 | 9.6 | 8.1 |
| MgO | 5.5 | 6.1 | 4.1 | 7.9 | 4.1 | 6.7 | 6.0 | 8.5 | 7.0 | 7.6 |
| CaO | 3.5 | 3.5 | 3.5 | 1.0 | 3.6 | 3.5 | 3.5 | 0 | 0 | 0 |
| SrO | 0 | 0 | 0 | 1.0 | 0 | 0 | 0 | 0 | 0 | 0 |
| $Na_2O$ | 8.0 | 7.1 | 9.0 | 11.1 | 9.0 | 7.1 | 9.0 | 9.3 | 11.7 | 9.8 |
| $K_2O$ | 14.0 | 14.9 | 13.0 | 6.5 | 13.0 | 13.1 | 10.2 | 19.8 | 5.9 | 7.4 |
| $ZrO_2$ | 2.5 | 2.5 | 2.5 | 1.3 | 2.5 | 2.5 | 2.5 | 1.8 | 4.8 | 4.9 |

TABLE 10

| | Examples | | | | | | | | | |
|---|---|---|---|---|---|---|---|---|---|---|
| | 21 | 22 | 23 | 24 | 25 | 26 | 27 | 28 | 29 | 30 |
| $SiO_2$ | 61.3 | 63.4 | 63.8 | 55.7 | 55.9 | 56.2 | 55.7 | 55.9 | 57.8 | 57.7 |
| $Al_2O_3$ | 8.1 | 6.5 | 6.5 | 12.4 | 12.4 | 12.5 | 12.4 | 12.4 | 11.1 | 12.6 |
| MgO | 8.3 | 8.0 | 7.7 | 4.0 | 5.2 | 6.5 | 5.2 | 6.5 | 6.6 | 6.6 |
| CaO | 0 | 0 | 0 | 3.4 | 1.7 | 0 | 1.7 | 0 | 0.9 | 0 |
| SrO | 0 | 0 | 0 | 0 | 0 | 0 | 0 | 0 | 0 | 0 |
| $Na_2O$ | 9.3 | 8.5 | 8.4 | 11.3 | 11.4 | 11.4 | 10.4 | 10.4 | 11.5 | 11.5 |
| $K_2O$ | 8.2 | 8.8 | 8.8 | 8.6 | 8.6 | 8.7 | 10.0 | 10.1 | 7.3 | 8.8 |
| $ZrO_2$ | 4.9 | 4.9 | 4.9 | 4.7 | 4.7 | 4.7 | 4.7 | 4.7 | 4.8 | 2.9 |

TABLE 11

| | Examples | | | | | | | | | |
|---|---|---|---|---|---|---|---|---|---|---|
| | 31 | 32 | 33 | 34 | 35 | 36 | 37 | 38 | 39 | 40 |
| $SiO_2$ | 58.9 | 58.1 | 59.6 | 58.0 | 60.7 | 66.4 | 62.3 | 63.1 | 63.0 | 60.9 |
| $Al_2O_3$ | 10.3 | 11.1 | 10.4 | 11.1 | 8.8 | 8.8 | 8.1 | 9.4 | 1.5 | 9.5 |
| MgO | 6.9 | 7.5 | 6.9 | 7.2 | 7.9 | 4.5 | 7.7 | 0 | 0.6 | 5.0 |
| CaO | 0.4 | 0 | 0 | 0 | 0 | 0 | 1.7 | 7.8 | 0.8 | 6.1 |
| SrO | 0 | 0 | 0 | 0 | 0 | 0 | 0 | 0 | 0 | 1.6 |
| $Na_2O$ | 10.6 | 10.6 | 11.6 | 11.6 | 10.3 | 12.2 | 9.9 | 10.0 | 10.2 | 4.8 |
| $K_2O$ | 8.1 | 8.8 | 6.6 | 7.3 | 7.4 | 5.2 | 7.5 | 8.7 | 18.3 | 9.5 |
| $ZrO_2$ | 4.8 | 3.8 | 4.8 | 4.8 | 4.9 | 2.9 | 3.9 | 1.0 | 5.5 | 2.5 |
| $Li_2O$ | 0 | 0 | 0 | 0 | 0 | 0 | 0.5 | 0 | 0 | 0 |

TABLE 12

| | Examples | | | | | | | | | |
|---|---|---|---|---|---|---|---|---|---|---|
| | 41 | 42 | 43 | 44 | 45 | 46 | 47 | 48 | 49 | 50 |
| $SiO_2$ | 65.2 | 65.2 | 62.2 | 62.1 | 59.0 | 60.6 | 72.5 | 66.1 | 65.7 | 62.3 |
| $Al_2O_3$ | 6.0 | 6.0 | 8.2 | 8.3 | 8.0 | 8.1 | 1.5 | 8.8 | 10.4 | 8.8 |
| MgO | 7.9 | 7.9 | 7.1 | 10.4 | 8.4 | 7.6 | 4.0 | 3.8 | 3.8 | 7.8 |
| CaO | 4.0 | 1.0 | 3.6 | 3.6 | 3.5 | 3.6 | 8.0 | 0 | 0 | 0.2 |
| SrO | 1.0 | 1.0 | 0 | 0 | 0 | 0 | 0 | 0 | 0 | 0 |
| $Na_2O$ | 8.1 | 14.1 | 9.0 | 5.4 | 5.2 | 7.2 | 13.5 | 13.2 | 12.1 | 15.8 |
| $K_2O$ | 6.5 | 3.5 | 7.4 | 7.5 | 13.2 | 10.3 | 0.5 | 5.2 | 5.2 | 4.9 |
| $ZrO_2$ | 1.3 | 1.3 | 2.6 | 2.6 | 2.5 | 2.5 | 0 | 2.9 | 2.9 | 0 |

TABLE 13

| | Examples | | | | | | |
|---|---|---|---|---|---|---|---|
| | 51 | 52 | 53 | 54 | 55 | 56 | 57 |
| $SiO_2$ | 63.4 | 57.9 | 58.4 | 62.0 | 66.1 | 74 | 62 |
| $Al_2O_3$ | 8.8 | 13.0 | 13.0 | 8.7 | 7.5 | 5 | 10 |
| MgO | 8.2 | 4.0 | 3.0 | 7.7 | 4.4 | 4 | 4 |
| CaO | 0.2 | 4.0 | 1.0 | 0.4 | 0 | 0 | 0 |
| SrO | 0 | 0 | 0 | 0 | 0 | 0 | 0 |
| $Na_2O$ | 15.3 | 12.0 | 13.0 | 10.9 | 15.9 | 12 | 9 |
| $K_2O$ | 3.9 | 4.0 | 3.5 | 9.5 | 5.2 | 5 | 9 |
| $ZrO_2$ | 0 | 5.0 | 5.0 | 0 | 0 | 0 | 1 |
| $B_2O_3$ | 0 | 0 | 0 | 0 | 0.15 | 0 | 0 |
| ZnO | 0 | 0 | 0 | 0 | 0 | 0 | 4 |
| $TiO_2$ | 0 | 0 | 3.0 | 0 | 0 | 0 | 1 |

INDUSTRIAL APPLICABILITY

The glass of the present invention can be used as a cover glass for display devices or the like.

The entire disclosures of Japanese Patent Application No. 2008-142579 filed on May 30, 2008 and Japanese Patent Application No. 2009-109236 filed on Apr. 28, 2009 including specifications, claims, drawings and summaries are incorporated herein by reference in their entireties.

What is claimed is:

1. A glass plate for display devices, which is obtained by chemically tempering a glass plate comprising, as represented by mol % based on the following oxides,
   from 50 to 74% of $SiO_2$,
   from 1 to 10% of $Al_2O_3$,
   from 6 to 14% of $Na_2O$,
   from 4.0 to 15% of $K_2O$,
   at most 15% of MgO,
   from 0 to 0.5% of CaO and
   from 0 to 5% of $ZrO_2$,
   wherein
      the total content of $SiO_2$ and $Al_2O_3$ is at most 75%,
      the total content of $Na_2O$ and $K_2O$ is from 12 to 25%,
      the total content of MgO and CaO is at most 15%,
      the content of MgO is at least 6.5 mass %,
      said glass plate is chemically tempered, and
      said glass plate has a thickness of 0.2 to 1.0 mm.

2. The glass plate for display devices according to claim 1, wherein said glass plate further comprises BaO in a non-zero amount and the amount of BaO is less than 1%.

3. The glass plate for display devices according to claim 1, wherein the glass plate further comprises at least one of SrO or BaO in a non-zero amount, and the total content of alkaline earth metal oxides is at most 15%.

4. The glass plate for display devices according to claim 1, wherein the glass plate contains no $Li_2O$.

5. The glass plate for display devices according to claim 1, wherein the glass plate contains at most 2% of $Li_2O$.

6. The glass plate for display devices according to claim 1, wherein the glass plate is made by a float process followed by chemical tempering.

7. The glass plate for display devices according to claim 1, wherein the glass plate contains a compressive stress layer and the thickness t of the compressive stress layer is from 20 to 50 μm.

8. The glass plate for display devices according to claim 1, wherein the glass plate contains a compressive stress layer and the thickness t of the compressive stress layer is from 50 to 88 μm.

9. The glass plate for display devices according to claim 1, wherein the glass plate has a surface compressive stress S of from 300 to 629 mPa.

10. The glass plate for display devices according to claim 1, wherein said glass plate further comprises $B_2O_3$ in a non-zero amount and the amount of $B_2O_3$ is less than 1%.

11. A glass plate for display devices, wherein the glass plate comprises, as represented by mol % based on the following oxides,
   from 60 to 70% of $SiO_2$,
   from 2 to 8% of $Al_2O_3$,
   from 6 to 14% of $Na_2O$,
   from 3.5 to 8% of $K_2O$,
   at most 15% of MgO,
   from 0 to 0.5% of CaO and
   from 0 to 5% of $ZrO_2$,
   wherein
      the total content of $SiO_2$ and $Al_2O_3$ is at most 75%,
      the total content of $Na_2O$ and $K_2O$ is at most 18%,
      the total content of MgO and CaO is at most 15%,
      the sum of the content of $K_2O$ multiplied by 1.7 and the content of $Na_2O$ is less than 19%,
      the content of MgO is at least 6.5 mass %,
      said glass plate is chemically tempered, and
      said glass plate has a thickness of 0.2 to 1.0 mm.

12. The glass plate for display devices according to claim 11, wherein said glass plate further comprises BaO in a non-zero amount and the amount of BaO is less than 1%.

13. The glass plate for display devices according to claim 11, wherein the glass plate further comprises at least one of SrO or BaO in a non-zero amount, and the total content of alkaline earth metal oxides is at most 15%.

14. The glass plate for display devices according to claim 11, wherein the glass plate contains no $Li_2O$.

15. The glass plate for display devices according to claim 11, wherein the glass plate contains at most 2% of $Li_2O$.

16. The glass plate for display devices according to claim 11, wherein the glass plate contains a compressive stress layer and the thickness t of the compressive stress layer is from 20 to 50 μm.

17. The glass plate for display devices according to claim 11, wherein the glass plate contains a compressive stress layer and the thickness t of the compressive stress layer is from 50 to 88 μm.

18. The glass plate for display devices according to claim 11, wherein the glass plate has a surface compressive stress S of from 300 to 629 mPa.

19. The glass plate for display devices according to claim 11, wherein said glass plate further comprises $B_2O_3$ in a non-zero amount and the amount of $B_2O_3$ is less than 1%.

20. A glass plate for display devices, wherein in the glass plate comprises, as represented by mol % based on the following oxides,
   $SiO_2$ is from 63% to 74%,
   $Al_2O_3$ is from 3% to 10%,
   $Na_2O$ is from 8% to 12%,
   $K_2O$ is from 4 to 8%,
   MgO is at most 14%,
   CaO is from 0 to 1%,
   $ZrO_2$ is from 1 to 4%, and
   wherein
      the total content of $SiO_2$ and $Al_2O_3$ is at most 75%,
      $Na_2O+K_2O$ is from 14 to 17%,
      the difference obtained by deducting the content of $Al_2O_3$ from $Na_2O+K_2O$ is at least 10%,
      the total content of MgO and CaO is at most 15%,
      the content of MgO is at least 6.5 mass %,
      said glass plate is chemically tempered, and
   said glass plate has a thickness of 0.2 to 1.0 mm.

21. The glass plate for display devices according to claim 20, wherein the sum of the content of $K_2O$ multiplied by 1.7 and the content of $Na_2O$ is less than 19%.

22. A glass plate for display devices, wherein said glass plate comprises, as represented by mol % based on the following oxides,
   from 50 to 74% of $SiO_2$,
   from 1 to 10% of $Al_2O_3$,
   from 6 to 12% of $Na_2O$,
   from 4 to 15% of $K_2O$,
   MgO is at most 14%, from 0 to 10% of CaO and
from 0 to 5% of $ZrO_2$,
$B_2O_3$ in a non-zero amount and the amount of $B_2O_3$ is less than 1%
wherein
   the total content of $SiO_2$ and $Al_2O_3$ is at most 75%,
   the total content of $Na_2O$ and $K_2O$ is from 14 to 25%,
   the difference obtained by deducting the content of $Al_2O_3$ from $Na_2O+K_2O$ is at least 10%,
   the total content of MgO and CaO is at most 15%,
   the content of MgO is at least 6.5 mass %,
   said glass plate is chemically tempered, and
said glass plate has a thickness of 0.2 to 1.0 mm.

\* \* \* \* \*